United States Patent
Ishizaki

(10) Patent No.: US 9,516,872 B2
(45) Date of Patent: Dec. 13, 2016

(54) MITE TRAPPING MAT

(71) Applicant: ISHIZAKI SHIZAI CO., LTD., Kashiwara-shi (JP)

(72) Inventor: Shingo Ishizaki, Kashiba (JP)

(73) Assignee: ISHIZAKI SHIZAI CO., LTD., Kashiwara-Shi, Osaka (JP)

(*) Notice: Subject to any disclaimer, the term of this patent is extended or adjusted under 35 U.S.C. 154(b) by 144 days.

(21) Appl. No.: 14/329,309

(22) Filed: Jul. 11, 2014

(65) Prior Publication Data
US 2015/0033615 A1    Feb. 5, 2015

(30) Foreign Application Priority Data

Jul. 31, 2013  (JP) ................... 2013-159148
Oct. 31, 2013  (JP) ................... 2013-226189

(51) Int. Cl.
*A01M 1/02* (2006.01)
*A01M 1/10* (2006.01)
*A01M 1/20* (2006.01)

(52) U.S. Cl.
CPC ............. *A01M 1/103* (2013.01); *A01M 1/026* (2013.01); *A01M 1/2011* (2013.01)

(58) Field of Classification Search
CPC ........ A01M 1/02; A01M 1/026; A01M 1/103; A01M 1/2011
See application file for complete search history.

(56) References Cited

U.S. PATENT DOCUMENTS 4,709,503 A * 12/1987 McQueen ............... A01M 1/14
                                                      43/114
4,815,231 A * 3/1989 McQueen ............... A01M 1/14
                                                      43/114

(Continued)

FOREIGN PATENT DOCUMENTS

JP    2001-120147 A    5/2001
JP    2003-159169 A    6/2003

(Continued)

OTHER PUBLICATIONS

Machine translation of JP 2001120147.*

(Continued)

*Primary Examiner* — Christopher P Ellis
*Assistant Examiner* — Michael Wang
(74) *Attorney, Agent, or Firm* — Buchanan Ingersoll & Rooney PC

(57) ABSTRACT

A mite trapping mat includes a mite attracting material; a film bag enclosing the mite attracting material; and a buffer element which forms a space inside the film bag. The film bag has a large number of small holes penetrating through the film, and the inside space of the film bag is a dark space. A mite trapping paper container includes: a mite attracting material; a buffer element containing the mite attracting material; and a flat paper box case in which the buffer element is stored. The box case has a large number of small holes penetrating from an outer surface to an inner surface, and an inside space of the box case is a dark space. At least any of a product name, a purpose of use, and a disclaimer is shown on a surface of the box case. The buffer element is made of at least any of cotton, cloth, nonwoven fabric, or grains which are larger than the small holes and is stuffed into the box case such that the box case is almost full.

6 Claims, 6 Drawing Sheets

(56) References Cited

U.S. PATENT DOCUMENTS

| | | | | | |
|---|---|---|---|---|---|
| 5,119,586 | A | * | 6/1992 | Townsend | A01M 1/14 43/114 |
| 5,359,808 | A | * | 11/1994 | Fitsakis | A01M 1/2016 43/131 |
| 5,713,153 | A | * | 2/1998 | Cook | A01M 1/14 43/114 |
| 6,415,545 | B1 | * | 7/2002 | Watanabe | A01M 1/02 43/114 |
| 6,862,839 | B2 | * | 3/2005 | Watanabe | A01M 1/026 43/114 |
| 2009/0313883 | A1 | * | 12/2009 | Olson | A01M 1/023 43/131 |
| 2012/0227313 | A1 | * | 9/2012 | Mozeika, III | A01M 1/2011 43/121 |

FOREIGN PATENT DOCUMENTS

| | | |
|---|---|---|
| JP | 2006-333846 A | 12/2006 |
| JP | 2006-340606 A | 12/2006 |
| JP | 5121228 B2 | 1/2013 |

OTHER PUBLICATIONS

Japanese Office Action (Notification of Reasons for Refusal), dated Dec. 3, 2013, for Japanese Application No. 2013-226189, and English translation.

* cited by examiner

MITE TRAPPING MAT

BACKGROUND OF THE INVENTION

1. Field of the Invention

The present invention relates to a mite trapping mat and mite trapping paper container and particularly to a simple mite trapping mat and mite trapping paper container for trapping mites inhabiting houses.

2. Description of Related Art

Various known examples of a mat for trapping mites inhabiting houses are disclosed in, for example, Japanese Patent No. 5121228, Japanese Laid-Open Publication No. 2006-333846, and Japanese Laid-Open Publication No. 2006-340606. These trapping mats are to be installed under a carpet or mattress, and after the passage of about three months, mites trapped in the mats are to be exterminated by discarding the mats themselves.

Although mites like to inhabit dark spaces (negative phototaxis), the conventional trapping mats are designed to attract mites by a scent that mites like but are not designed to attract mites by forming a dark space. The conventional mats have difficulty in printing on the surface of the main body of the mats so that the product name of a mat in use, the purpose of use, how to use, disclaimers, etc., are not clearly shown, and a label for recording the date of installation, for example, is enclosed together. At the time of discarding a mat, there are many mite droppings, dead mite bodies, and surviving mites on the surface of the mat, and there is a large probability that these fall off and are scattered off. Since the mat has breathability across the entire surface so that there is only a small difference in terms of an attracting scent between the inside and outside of the mat, there is a problem that, for example, a mite which is about to enter the mat can leave away from the mat.

Of a mite trapping case disclosed in Japanese Laid-Open Publication No. 2001-120147, the case main body is formed by a resin molded product, and the inside space of the case main body is a dark space. However, the resin molded product leads to increase of the manufacturing cost while it has difficulty in printing on the surface, and this printing difficulty also leads to increase of the cost.

SUMMARY OF THE INVENTION

The first object of the present invention is to provide a mite trapping mat which is capable of effectively attracting mites and confining the mites inside the mat, and which has a printable surface.

The second object of the present invention is to provide a mite trapping paper container which is capable of effectively attracting mites and confining the mites inside the container, which is simply and inexpensively manufacturable, and which has an inexpensively printable case surface.

A mite trapping mat, which is the first aspect of the present invention, includes: a mite attracting material; a film bag enclosing the mite attracting material; and a buffer element which forms a space inside the film bag, wherein the film bag has a large number of small holes penetrating through the film, and the inside space of the film bag is a dark space.

The mite trapping mat is placed in a closet or drawer or under a carpet to attract mites such that the mites enter the film bag through the large number of small holes and stay there. Particularly, since the inside of the film bag is a dark space, mites that like dark places (negative phototaxis) are effectively attracted, and if once mites enter the bag, they will not come out due to the scent of the attracting material and the darkness. Further, the product name, the purpose of use, how to use, disclaimers, etc., can be printed on the surface of the film bag. It is also possible to write the date of start of use, or the like, using a felt-tip pen.

In the above-described mite trapping mat, printing, coloring, or deposition may be provided on the film in order to make the inside space of the film bag a dark space. The total area of the small holes formed in the film bag is preferably not more than about 2% of the surface area of the film bag because the darkness inside the film bag would not be marred. For example, when the small holes have a diameter of 1.0 mm and arranged with intervals of 20 mm over the entire surface of the film, the total area of the small holes is only 1/500 of the film surface area, so that the difference in brightness between the inside and outside of the film bag is large, and the dark space is sufficiently formed.

Mites like the scent of unsaturated fatty acids, and therefore, the attracting material preferably contains unsaturated fatty acids. Mites cannot carry out activities, such as breeding, when the humidity is around 60% and can die when the humidity is not more than 50%. If a desiccating agent is provided inside the film bag such that the humidity is maintained at around 50%, mites which have entered the film bag will die without breeding. Further, providing an adhesive layer inside the film bag enables to adhesively bind mites which have entered the film bag.

A mite trapping paper container, which is the second aspect of the present invention, includes: a mite attracting material; a buffer element containing the mite attracting material; and a flat paper box case in which the buffer element is stored, wherein the box case has a large number of small holes penetrating from an outer surface to an inner surface, and an inside space of the box case is a dark space, at least any of a product name, a purpose of use, and a disclaimer is shown on a surface of the box case, and the buffer element is made of at least any of cotton, cloth, nonwoven fabric, or grains which are larger than the small holes and is stuffed into the box case such that the box case is almost full.

The mite trapping paper container is placed in a closet or drawer or under a carpet to attract mites such that the mites enter the box case through a large number of small holes and stay in the buffer element. Particularly, since the inside of the box case is a dark space, mites that like dark places (negative phototaxis) are effectively attracted, and if once mites enter the case, they will not come out due to the scent of the attracting material and the darkness. Further, since the box case is made of paper, the material cost and the manufacturing cost are low, while the product name, the purpose of use, how to use, disclaimers, a frame for recording the date of start of use, etc., can be inexpensively printed on the surface, and the date of start of use can be written down. Further, the small holes can be easily and inexpensively formed by Thomson processing so as to have arbitrary size and number.

In the above-described mite trapping paper container, it is preferred that the small holes have a diameter of about 0.5 to 1.5 mm and an area of not more than about 2.0 $mm^2$, and the total hole area is not more than about 2% of the total surface area of the box case. So long as the small holes have such an area ratio, the light blocking property inside the box case would not be marred.

If a desiccating agent is provided inside the box case or in the buffer element such that the humidity is maintained at around 50%, mites which have entered the box case or buffer element will die without breeding. Further, providing an adhesive agent inside the box case enables to adhesively bind mites which have entered the box case.

DETAILED DESCRIPTION OF THE PREFERRED EMBODIMENTS

Figure 1:
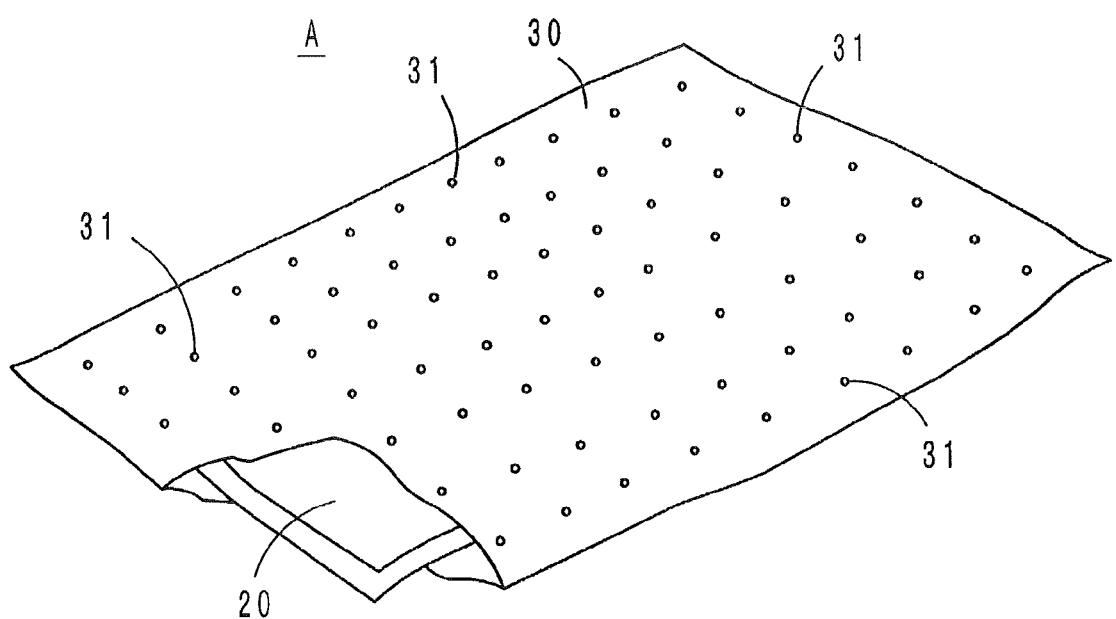
FIG. 1 is a partially-cutaway perspective view of a mite trapping mat which is the first example.

Hereinafter, examples of a mite trapping mat and a mite trapping paper container according to the present invention are described with reference to the attached drawings. Like elements and parts are referred to using common reference numerals throughout the drawings, and the repetitive description is omitted.

First Example; See FIG. 1 to FIG. 3

Figure 2:
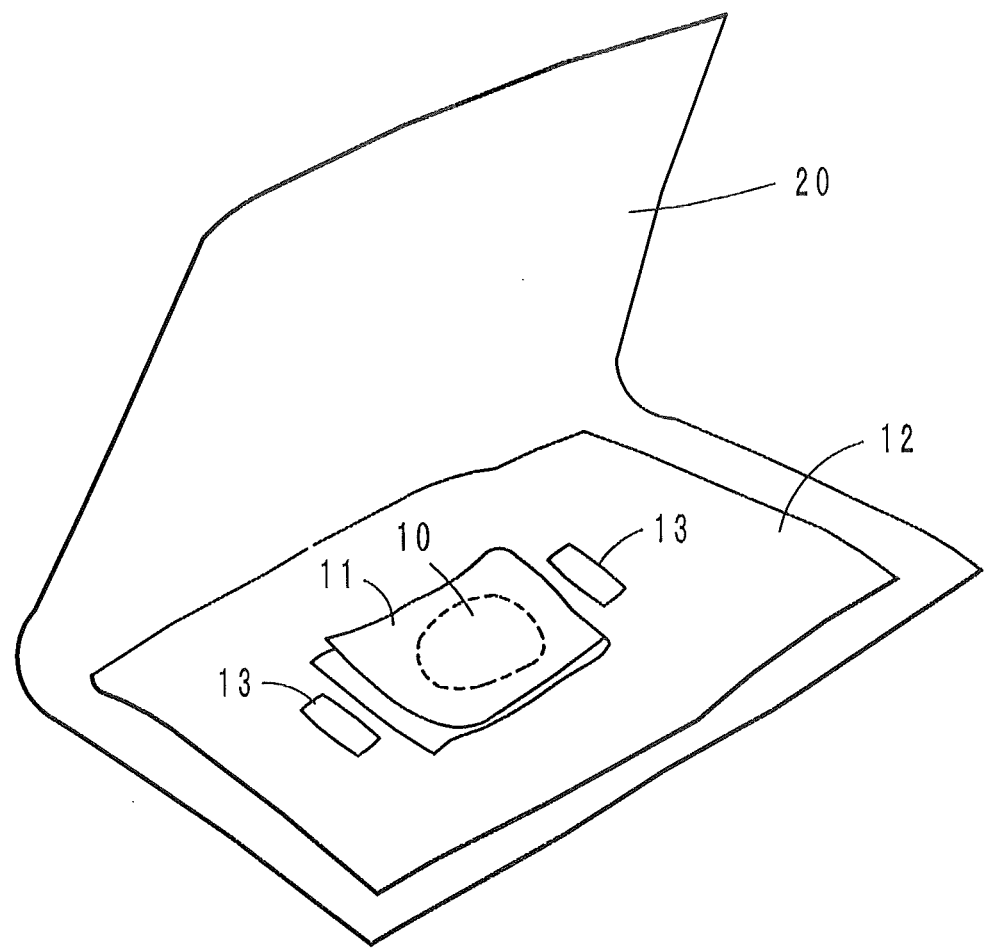
FIG. 2 is a perspective view showing the internal configuration of the mite trapping mat.
Figure 3:
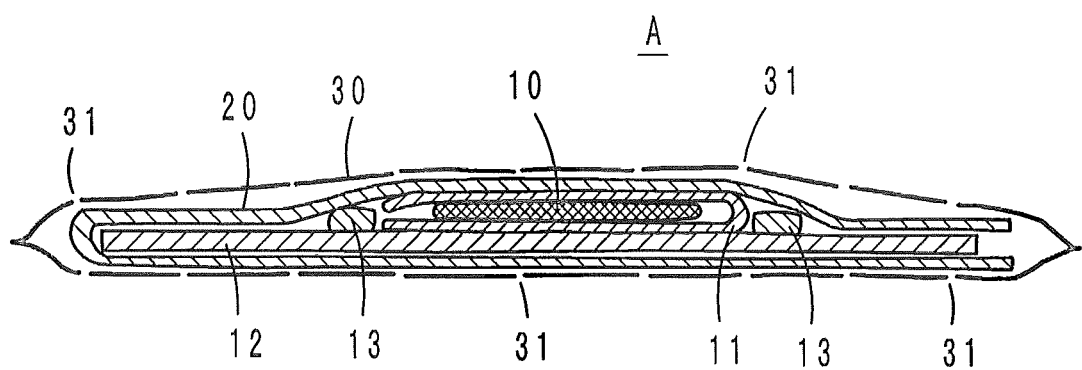
FIG. 3 is a cross-sectional view of the mite trapping mat.

A mite trapping mat A, as shown in FIGS. 1, 2 and 3, which is the first example, generally includes a mite attracting material 10, a film bag 30 enclosing the mite attracting material 10, and a buffer element 20 which forms a space inside the film bag 30.

Mites have the property of liking the scent of an unsaturated fatty acid rich substance. Therefore, the mite attracting material 10 used is preferably an oblate ball which is made of, for example, wheat flour, dried fish powder, or biscuit powder kneaded with rapeseed oil. The mite attracting material 10, which is enclosed in a small bag 11, is placed at a generally central portion of a double-sided adhesive tape 12. A desiccating agent 13 may be placed on both sides of the attracting material 10. The small bag 11 is made of a highly breathable fabric, such as gauze, or a nonwoven fabric, in the form of a folio. As the desiccating agent 13, silica gel or the like can be preferably used.

The buffer element 20 is made of a highly breathable fabric, such as gauze, or a nonwoven fabric, in the form of a folio. The buffer element 20 is arranged to sandwich the small bag 11 containing the attracting material 10 and the double-sided adhesive tape 12.

The film bag 30 has a large number of small holes 31 penetrating through the film. The four sides of the film bag 30 are sealed such that the inside of the film bag 30 is a dark space that mites like. Preferred examples of the film used include PET films and polypropylene films. Making the inside of the film bag 30 a dark space can be realized by coating the film with an aluminum deposition film or a black-colored film or by printing a layer of a color which has high light-blocking property, such as black, dark blue, or dark red, over the entire surface of the film. It is preferred that the product name, the purpose of use, how to use, disclaimers, etc., are printed on the front or rear surface of the film. Specifically, providing a white-printed area in which the date of start of use, or the like, can be written using a felt-tip pen is helpful.

The small holes 31 are formed before the bag manufacturing step of the bag 30. For example, the small holes 31 have a diameter of 0.2 to 1.5 mm and are formed with intervals of 2 to 50 mm. Most of the mites inhabiting houses are Dermatophagoides mites and Acarid mites, which have a small body length of 0.2 to 0.5 mm and a small body width of 0.05 to 0.2 mm, so that they can easily pass through the small holes 31 if the small holes 31 have a diameter of not less than 0.2 mm.

The mite trapping mat A which has the above-described configuration is placed in a closet or drawer or under a carpet to attract mites such that the mites enter the film bag 30 through a large number of small holes 31 and stay there. Since the inside of the film bag 30 is a dark space, mites that have negative phototaxis are effectively attracted, and if once mites enter the bag, they will not come out due to the scent of the attracting material 10 and the darkness.

The small holes 31 formed in the film bag 30 are very small portions so that the inside of the film bag 30 can be maintained to be a dark space and that, when discarding the trapping mat A, there is little probability that dead mite bodies and mite droppings will fall off or be scattered off.

Particularly, the film bag 30 is made of a non-breathable plastic film so that passage of air between the inside and outside of the bag 30 is blocked, while passage of air is allowed only through some of the small holes 31. Therefore, the attracting scent emitted by the attracting material 10 is stronger inside the bag 30 while it is considerably weak outside the bag 30. The attracting scent coming out through the small holes 31 is heavy. That is, the heavy attracting scent emitted through the small holes 31 guides mites into the bag 30 through the small holes 31. If once mites enter a dark space which is filled with a heavy attracting scent, they will not come out through the small holes 31, which are light sources when seen from the inside, because they dislike light.

Since mites are vulnerable to low-humidity environments, providing the desiccating agent 13 inside the film bag 30 is preferable in terms of enhancing the death of trapped mites. Mites are also adhesively trapped by the double-sided adhesive tape 12.

Second Example; See FIG. 4 to FIG. 6

Figure 4:
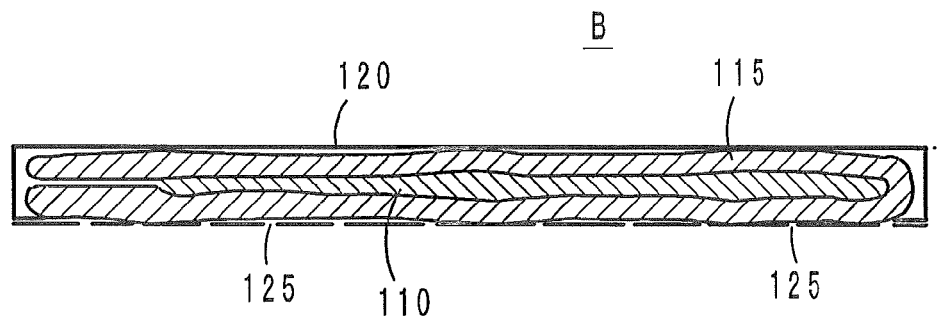
FIG. 4 is a cross-sectional view of a mite trapping paper container which is the second example.
Figure 5:
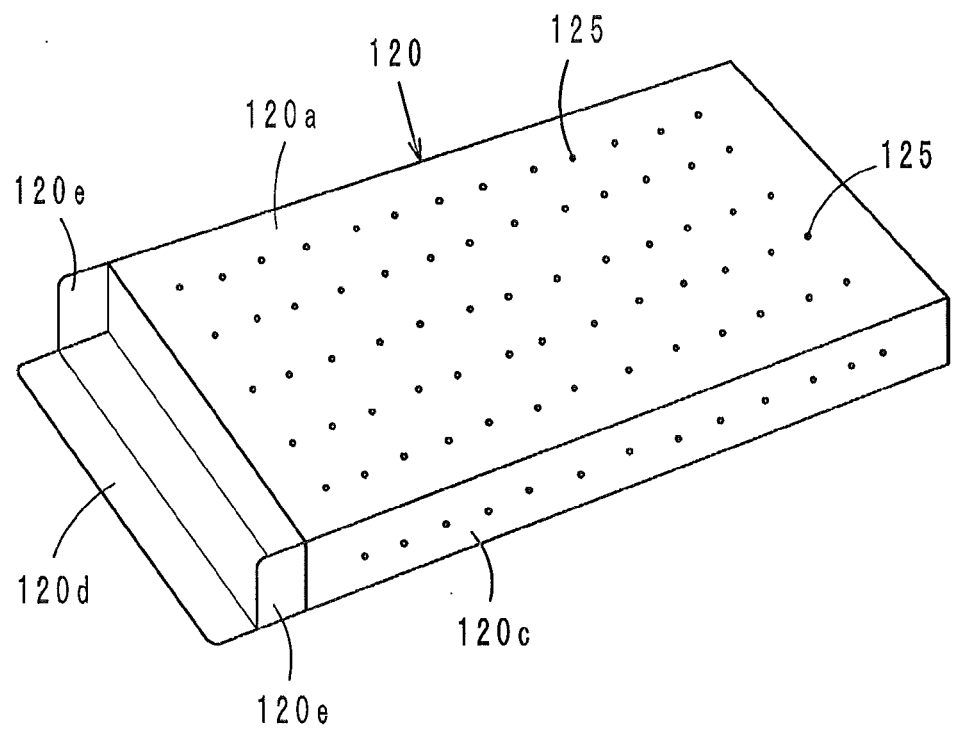
FIG. 5 is a perspective view of a paper box case.

A mite trapping paper container B, as shown in FIG. 4, which is the second example, generally includes a mite attracting material 110 in the form of powder, a buffer element 115 which contains the mite attracting material 110, and a flat paper box case 120 in which the buffer element 115 is stored.

The box case 120 is preferably made of cardboard but may be made of synthetic paper, a sheet containing synthetic resins, corrugated paper, or the like. The box case 120 has a large number of small holes 125 penetrating from the outer surface to the inner surface, and the inside of the box case 120 is a dark space.

Figure 6:
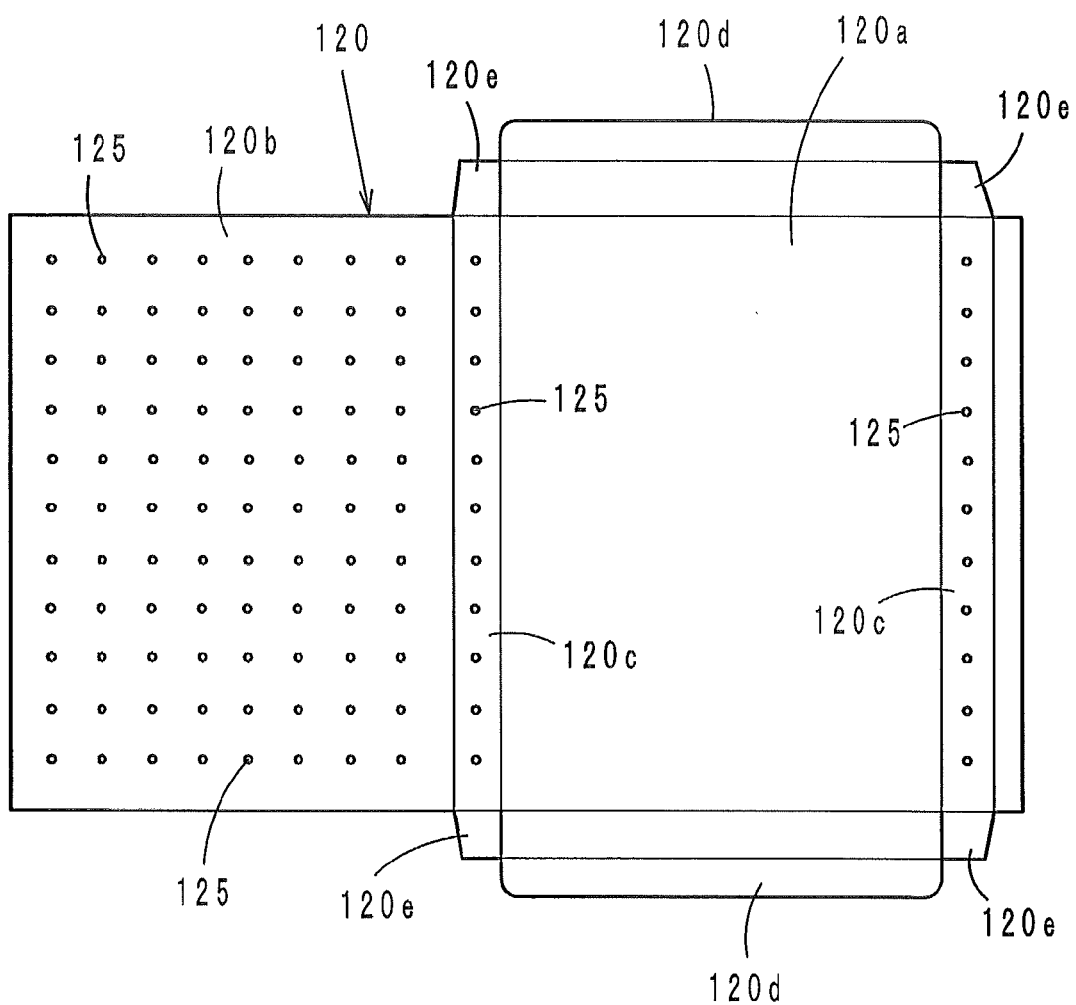
FIG. 6 is a developed view of the box case.

The box case 120 is in a developed form shown in FIG. 6 when it is manufactured. That is, it is constituted of a top surface portion 120a, a bottom surface portion 120b, right and left lateral surface portions 120c, lid portions 120d at opposite end surfaces, and flap portions 120e at the four corners. The small holes 125 are formed in the bottom surface portion 120b and the lateral surface portions 120c but may be formed in the top surface portion 120a.

The mite attracting material 110 used is preferably a ball which is made of, for example, wheat flour, dried fish powder, or biscuit powder kneaded with rapeseed oil (or may be crushed grains).

The buffer element 115 is made of a breathable material, such as cotton, polyester cotton, cloth, gauze, soft nonwoven fabric, or the like, and is stuffed into the box case 120 such that the box case 120 is almost full. This buffer element 115 is folded so as to sandwich the mite attracting material 110 such that the mite attracting material 110 is prevented from spreading inside the box case 120 and the buffer element 115 functions as a path for mites. The buffer element 115 also functions as a holder when the desiccating agent or adhesive agent is inserted into the box case 120. Note that the buffer element 115 may be grains which are larger than the small holes 125 (e.g., chaff) or linear elements (e.g., straws).

The box case 120 is made of paper so that it has light blocking property and the inside of the box case 120 is a dark space that mites like. On the surface of the box case 120, the product name, the purpose of use, how to use, disclaimers, a frame for recording the date of start of use, etc., are printed.

The mite trapping paper container B which has the above-described configuration is placed in a closet or drawer or under a carpet to attract mites such that the mites enter the box case 120 through a large number of small holes 125 and stay there. Since the inside of the box case 120 is a dark space, mites that have negative phototaxis are effectively attracted, and if once mites enter the case, they will not come out due to the scent of the attracting material 110 and the darkness.

The small holes 125 preferably have a diameter of about 0.5 to 1.5 mm. Most of the mites inhabiting houses are Dermatophagoides mites and Acarid mites as previously mentioned. They can easily pass through the small holes 125 so long as the small holes 125 have a diameter of not less than 0.2 mm. The small holes 125 have a small diameter so that, when discarding the trapping case B, there is little probability that dead mite bodies and mite droppings will fall off or be scattered off.

It is preferred that the small holes 125 which have the aforementioned diameter have an area of not more than about 2.0 mm$^2$, and the total hole area is not more than about 2% of the total surface area of the box case 120. So long as the small holes 125 have such an area ratio, the light blocking property inside the box case 120 would not be marred.

Particularly, the box case 120 is made of paper whose breathability is not so high that passage of air between the inside and outside of the box case 120 is almost blocked, while passage of air is allowed only through some of the small holes 125. Therefore, the attracting scent emitted by the attracting material 110 is stronger inside the box case 120 while it is considerably weak outside the box case 120. The heavy attracting scent emitted through the small holes 125 guides mites into the box case 120 through the small holes 125. If once mites enter a dark space which is filled with a heavy attracting scent, they will not come out through the small holes 125, which are light sources when seen from the inside, because they dislike light.

Third Example; See FIG. 7

Figure 7:
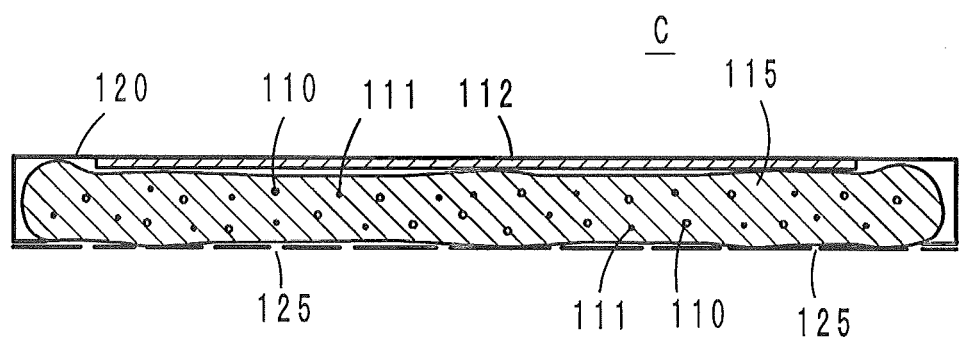
FIG. 7 is a cross-sectional view of a mite trapping paper container which is the third example.

A mite trapping paper container C, which is the third example, is configured such that, as shown in FIG. 7, a granular desiccating agent 111 (e.g., silica gel) is mixed together with the mite attracting material 110 inside a flocculent buffer element 115, and an adhesive agent 112 (e.g., double-sided adhesive tape) is provided on the ceiling portion of the box case 120. The configuration of the box case 120 is the same as that of the second example. The functions and effects are basically the same as those of the second example.

Since mites are vulnerable to low-humidity environments, providing the desiccating agent 111 inside the box case 120 is preferable in terms of enhancing the death of trapped mites. Mites are also adhesively trapped by the adhesive agent 112. Note that the desiccating agent 111 may be placed at any position so long as it is within the box case 120. The adhesive agent 112 may be placed at any position other than the ceiling portion of the box case 120.

Other Examples

A mite trapping mat and a mite trapping paper container according to the present invention are not limited to the above-described examples but can be variously modified within the scope of the spirit of the invention.

For example, in the mite trapping mat, the configuration of details of the film bag and the buffer element is arbitrary. In the mite trapping paper container, the planar shape of the box case may be any shape other than quadrangular shapes, such as circular shapes, polygonal shapes, etc. As a matter of course, the attracting material can be selected from various materials so long as it emits an attracting scent. Further, in the second example, the desiccating agent may be suitably used.

What is claimed is:

1. A mite trapping mat comprising:
   a mite attracting material;
   a film bag enclosing the mite attracting material; and
   a buffer element which forms a space inside the film bag,
   wherein the film bag has a large number of small holes penetrating through the film, and printing, coloring or deposition is provided on the film in order to make the inside space of the film bag a dark space,
   the small holes have a diameter within a range of 0.2 to 1.5 mm, and a total area of the small holes is not more than substantially 2% of the surface area of the film bag.

2. The mite trapping mat according to claim 1, wherein the buffer element is made of a fiber fabric or nonwoven fabric.

3. The mite trapping mat according to claim 1, wherein a desiccating agent is provided inside the film bag.

4. A mite trapping paper container comprising:
   a mite attracting material;
   a buffer element containing the mite attracting material; and
   a flat paper box case in which the buffer element is stored,
   wherein the box case has a large number of small holes penetrating from an outer surface to an inner surface, and an inside space of the box case is a dark space,
   the small holes have a diameter within a range of 0.2 to 1.5 mm, and a total area of the small holes is not more than substantially 2% of the surface area of the box case,
   at least any of a product name, a purpose of use, and a disclaimer is shown on a surface of the box case, and
   the buffer element is made of at least any of cotton, cloth, nonwoven fabric, or grains which are larger than the small holes and is stuffed into the box case such that the box case is almost full.

5. The mite trapping paper container according to claim 4, wherein an adhesive agent is provided inside the box case.

6. The mite trapping paper container according to claim 4, wherein a desiccating agent is stored inside the case.

* * * * *